United States Patent
Bao et al.

(10) Patent No.: US 12,112,417 B2
(45) Date of Patent: *Oct. 8, 2024

(54) ARTIFICIAL INTELLIGENCE-BASED ANIMATION CHARACTER DRIVE METHOD AND RELATED APPARATUS

(71) Applicant: Tencent Technology (Shenzhen) Company Limited, Shenzhen (CN)

(72) Inventors: Linchao Bao, Shenzhen (CN); Shiyin Kang, Shenzhen (CN); Sheng Wang, Shenzhen (CN); Xiangkai Lin, Shenzhen (CN); Xing Ji, Shenzhen (CN); Zhantu Zhu, Shenzhen (CN); Kuongchi Lei, Shenzhen (CN); Deyi Tuo, Shenzhen (CN); Peng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 91 days.

This patent is subject to a terminal disclaimer.

(21) Appl. No.: 18/080,655

(22) Filed: Dec. 13, 2022

(65) Prior Publication Data

US 2023/0123433 A1 Apr. 20, 2023

Related U.S. Application Data

(63) Continuation of application No. 17/405,965, filed on Aug. 18, 2021, now Pat. No. 11,605,193, which is a
(Continued)

(30) Foreign Application Priority Data

Sep. 2, 2019 (CN) .......................... 201910824770.0

(51) Int. Cl.
*G06T 13/40* (2011.01)
*G06T 13/20* (2011.01)
(Continued)

(52) U.S. Cl.
CPC ............ *G06T 13/40* (2013.01); *G06T 13/205* (2013.01); *G06V 20/46* (2022.01); *G06V 40/174* (2022.01);
(Continued)

(58) Field of Classification Search
None
See application file for complete search history.

(56) References Cited

U.S. PATENT DOCUMENTS 8,555,164 B2    10/2013  Huang et al.
8,725,507 B2     5/2014  Cortez et al.
(Continued)

FOREIGN PATENT DOCUMENTS

CN    104217454 A   12/2014
CN    107004287 A    8/2017
(Continued)

OTHER PUBLICATIONS

Chen Cao et al., "Face Warehouse: A 3D Facial Expression Database for Visual Computing", IEEE Transactions on Visualization and Computer Graphics, vol. 20, No. 3, Mar. 31, 2014, 11 pgs.
(Continued)

*Primary Examiner* — Tize Ma
(74) *Attorney, Agent, or Firm* — Morgan, Lewis & Bockius LLP

(57) ABSTRACT

This application discloses an artificial intelligence (AI) based animation character drive method. A first expression base of a first animation character corresponding to a speaker is determined by acquiring media data including a facial expression change when the speaker says a speech,
(Continued)

and the first expression base may reflect different expressions of the first animation character. After target text information is obtained, an acoustic feature and a target expression parameter corresponding to the target text information are determined according to the target text information, the foregoing acquired media data, and the first expression base. A second animation character having a second expression base may be driven according to the acoustic feature and the target expression parameter, so that the second animation character may simulate the speaker's sound and facial expression when saying the target text information, thereby improving experience of interaction between the user and the animation character.

12 Claims, 9 Drawing Sheets

Related U.S. Application Data continuation of application No. PCT/CN2020/111615, filed on Aug. 27, 2020.

(51) Int. Cl.
    *G06V 20/40*    (2022.01)
    *G06V 40/16*    (2022.01)
    *G10L 15/02*    (2006.01)

(52) U.S. Cl.
    CPC ........ *G10L 15/02* (2013.01); *G10L 2015/025* (2013.01)

(56) References Cited

U.S. PATENT DOCUMENTS

| | | | |
|---|---|---|---|
| 11,308,671 | B2* | 4/2022 | Chen .................. G06T 13/20 |
| 11,605,193 | B2 | 3/2023 | Bao et al. |
| 2010/0082345 | A1* | 4/2010 | Wang .................. G10L 13/00 704/E21.02 |
| 2013/0257877 | A1 | 10/2013 | Davis |
| 2017/0011745 | A1 | 1/2017 | Navaratnam |
| 2017/0154457 | A1 | 6/2017 | Theobald et al. |
| 2018/0157901 | A1 | 6/2018 | Arbatman et al. |
| 2019/0130629 | A1* | 5/2019 | Chand .................. G06V 10/56 |
| 2020/0213680 | A1 | 7/2020 | Ingel et al. |
| 2021/0056348 | A1 | 2/2021 | Berlin et al. |
| 2022/0392430 | A1* | 12/2022 | Kilgore ............... G10L 13/0335 |

FOREIGN PATENT DOCUMENTS

| | | | |
|---|---|---|---|
| CN | 108875633 A | 11/2018 | |
| CN | 109377540 A | 2/2019 | |
| CN | 109447234 A | 3/2019 | |
| CN | 110531860 A | 12/2019 | |
| JP | 2003141564 A | 5/2003 | |
| JP | 2012528390 A | 11/2012 | |
| JP | 2015210739 A | 11/2015 | |
| KR | 20190078015 A | 7/2019 | |
| WO | WO-2019196306 A1 * | 10/2019 | ......... G06F 17/2775 |

OTHER PUBLICATIONS

Extended European Search Report, EP20860658.2, Sep. 2, 2022, 14 pgs.

P. Garrido et al., "VDub: Modifying Face Video of Actors for Plausible Visual Alignment to a Dubbed Audio Track", Computer Graphics Forum, Journal of the European Association for Computer Graphics, vol. 34, No. 2, May 1, 2015, XP055827600, 12 pgs., Retrieved from the Internet: https://vcai.mpi-inf.mpg.de/files/EuroGraphics2015/dubbing_high.pdf.

Patrik Huber et al., "A Multiresolution 3D Morphable Face Model and Fitting Framework", 11th International Joint Conference on Computer Vision, Imaging and Computer Graphics Theory and Applications Visigrapp, Scitepress—Science and Technology Publications, Feb. 27, 2016, XP009532603, 8 pgs., Retrieved from the Internet: https://www.patrikhuber.ch/files/3DMM_Framework_VISAPP_2016.pdf.

Tencent Technology, ISRWO, PCT/CN2020/111615, Dec. 1, 2020, 8 pgs.

Tencent Technology, IPRP, PCT/CN2020/111615, Mar. 8, 2022, 6 pgs.

Zhigang Deng et al., "Expressive Facial Animation Synthesis by Learning Speech Coarticulation and Expression Spaces", IEEE Transactions on Visualization and Computer Graphics, IEEE, vol. 12, No. 6, Nov. 1, 2006, XP011149144, 1 pg., Retrieved from the Internet: https://pubmed.ncbi.nlm.nih.gov/17073374/.

Microsoft Corporation, International Search Report in PCT/US2010/035885, published under WO 2010/138428 A3 on Dec. 2, 2010, 4 pgs.

Tencent Technology, Korean Office Action, KR Patent Application No. 10-2021-7029221, Nov. 27, 2023, 10 pgs.

\* cited by examiner

```
1    0       5650000   sil
2    5650000 6300000   u
3    6300000 6550000   o
4    6550000 6850000   j
5    6850000 7200000   i
6    7200000 7500000   o
7    7500000 7750000   u
8    7750000 8450000   k
9    8450000 9150000   e
10   9150000 10650000  i
11   10650000 11700000 b
12   11700000 12150000 e
13   12150000 13150000 i
14   13150000 13600000 d
15   13600000 14250000 i
16   14250000 14550000 l
```

ARTIFICIAL INTELLIGENCE-BASED ANIMATION CHARACTER DRIVE METHOD AND RELATED APPARATUS

CROSS-REFERENCE TO RELATED APPLICATIONS

This application is a continuation of U.S. patent application Ser. No. 17/405,965, entitled "ARTIFICIAL INTELLIGENCE-BASED ANIMATION CHARACTER DRIVE METHOD AND RELATED APPARATUS" filed on Aug. 18, 2021, which is a continuation application of PCT Patent Application No. PCT/CN2020/111615, entitled "ARTIFICIAL INTELLIGENCE-BASED ANIMATION CHARACTER DRIVE METHOD AND RELATED APPARATUS" filed on Aug. 27, 2020, which claims priority to Chinese Patent Application No. 201910824770.0, entitled "ARTIFICIAL INTELLIGENCE-BASED ANIMATION CHARACTER DRIVE METHOD AND RELATED APPARATUS" filed with the China National Intellectual Property Administration on Sep. 2, 2019, all of which are incorporated herein by reference in their entirety.

FIELD OF THE TECHNOLOGY

This application relates to the field of data processing, and in particular, to driving of an animation character.

BACKGROUND OF THE DISCLOSURE

With the development of computer technologies, human-computer interactions have become more common, most of which, however, are pure speech interactions. For example, an interaction device may determine reply content according to a text or a speech inputted by a user, and play a virtual sound synthesized according to the reply content.

A sense of immersion of a user brought by this type of human-computer interactions is difficult to meet a current interaction demand by the user. To improve the sense of immersion of the user, use of an animation character having an expression change capacity, for example, capable of changing a mouth shape as an interaction object that interacts with the user is currently a research and development direction.

However, there is currently no sophisticated animation character drive method.

SUMMARY

To resolve the foregoing technical problems, this application provides an artificial intelligence-based (AI-based) animation character drive method and apparatus, to bring a realistic sense of presence and immersion to a user, thereby improving experience of interaction between the user and an animation character.

The following technical solutions are disclosed in the embodiments of this application:

According to a first aspect, an embodiment of this application provides an animation character drive method, performed by a computing device, the method including:

obtaining target text information and media data including a facial expression and a corresponding speech of a speaker;

determining a first expression base of a first animation character corresponding to the speaker according to the facial expression, the first expression base being used for identifying expressions of the first animation character;

determining, according to the target text information, the media data, and the first expression base, an acoustic feature and a target expression parameter corresponding to the target text information, the acoustic feature being used for characterizing a sound that simulates the speaker's sound when saying the target text information, and the target expression parameter being used for characterizing a change degree of a facial expression that simulates the speaker's facial expression when saying the target text information relative to the first expression base; and driving a second animation character having a second expression base according to the acoustic feature and the target expression parameter.

According to a second aspect, an embodiment of this application provides a computing device comprising a processor and a memory coupled to the processor. The memory stores a plurality of computer programs that, when executed by the processor, cause the computing device to perform the aforementioned animation character drive method.

According to a third aspect, an embodiment of this application provides a non-transitory computer-readable storage medium storing a plurality of computer programs that, when executed by a processor of a computing device, cause the computing device to perform the aforementioned animation character drive method.

It can be learned from the foregoing technical solutions that, a first expression base of a first animation character corresponding to a speaker may be determined by acquiring media data including a facial expression change when the speaker says a speech, and the first expression base may reflect different expressions of the first animation character. After target text information used for driving a second animation character is determined, an acoustic feature and a target expression parameter corresponding to the target text information may be determined according to the target text information, the foregoing media data, and the first expression base. The acoustic feature may be used for identifying a sound that is simulated when the speaker says the target text information, and the target expression parameter may be used for identifying a change degree of a facial expression that is simulated when the speaker says the target text information relative to the first expression base. A second animation character having a second expression base may be driven according to the acoustic feature and the target expression parameter, so that the second animation character may simulate, according to the acoustic feature, the sound produced when the speaker says the target text information, and make a facial expression that conforms to an expression of the speaker during sound production, to bring a realistic sense of presence and immersion to a user, thereby improving experience of interaction between the user and the animation character.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
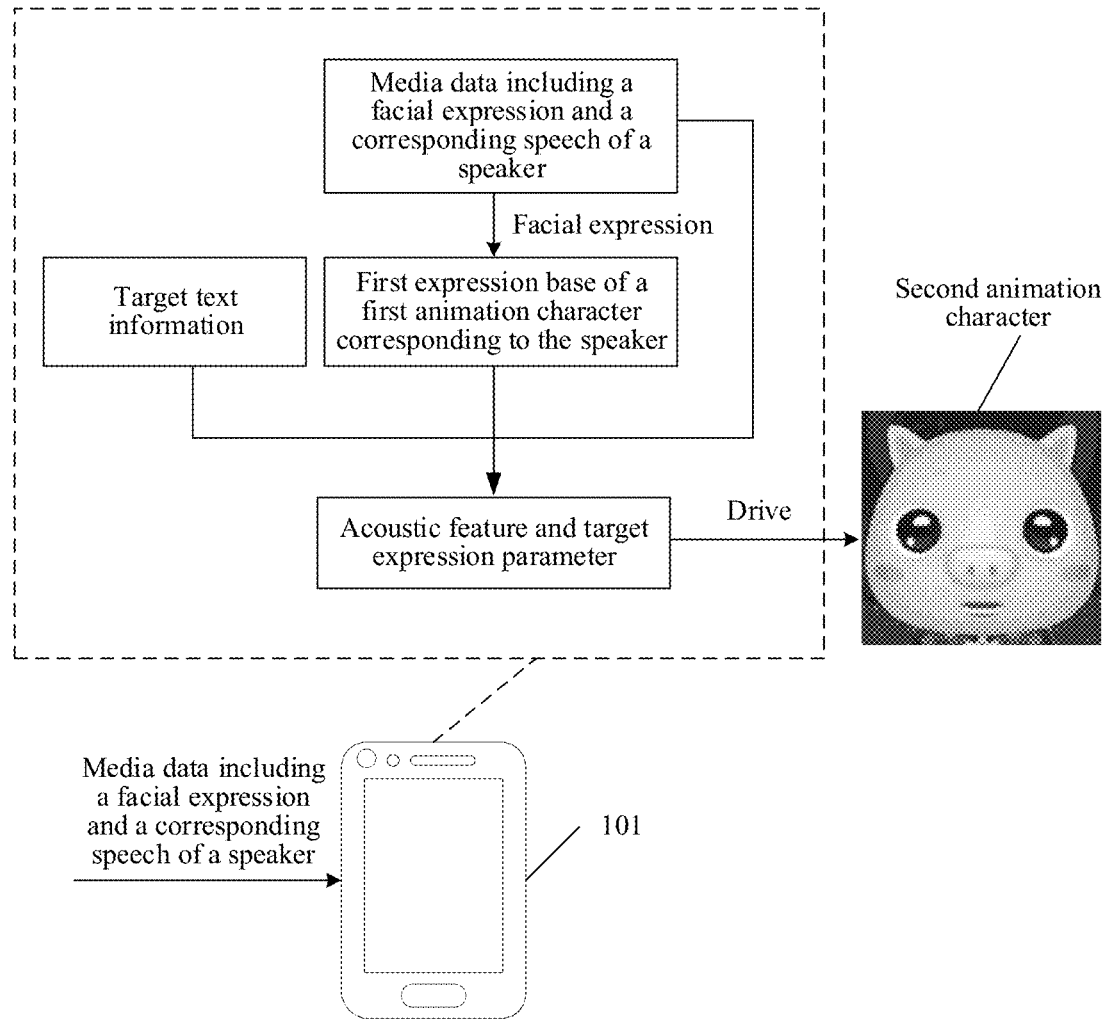
FIG. 1 is a schematic diagram of an application scenario of an artificial intelligence-based (AI-based) animation character drive method according to an embodiment of this application.

The following describes embodiments of this application with reference to the accompanying drawings.

Currently, use an animation character having an expression change capability as an interaction object that interacts with a user is a main research direction of human-computer interaction.

For example, in a game scene, a game character (an animation character) that has the same face shape as a user may be constructed, and when the user enters a text or a speech, the game character may produce a speech and make a corresponding expression (such as a mouth shape); or in a game scene, a game character that has the same face shape as a user is constructed, and when an opposite side inputs a text or a speech, the game character may reply a speech and make a corresponding expression according to the input of the opposite side.

To better drive the animation character, for example, to drive the animation character to produce a speech and make a corresponding expression, an embodiment of this application provides an artificial intelligence-based (AI-based) animation character drive method. In this method, a first expression base of a first animation character corresponding to a speaker may be determined by acquiring media data including a facial expression change when the speaker says a speech. After target text information used for driving a second animation character is determined, an acoustic feature and a target expression parameter corresponding to the target text information may be determined according to the target text information, the foregoing acquired media data, and the first expression base, so as to drive a second animation character having a second expression base according to the acoustic feature and the target expression parameter, so that the second animation character simulates, according to the acoustic feature, a sound produced when the speaker says the target text information, and makes a facial expression that conforms to an expression of the speaker during sound production, to drive the second animation character based on the text information.

The animation character drive method provided in the embodiments of this application is implemented based on AI. The AI is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning (ML)/deep learning (DL).

In the embodiments of this application, the mainly involved AI technologies include orientations such as the speech processing technology, the ML, and computer vision (image).

For example, a speech recognition technology, a text-to-speech (TTS) technology, and a voiceprint recognition technology may be involved in the speech technology. The speech recognition technology includes speech signal pre-processing, speech signal frequency analyzing, speech signal feature extraction, speech signal feature matching/recognition, speech training, and the like. Text-to-speech includes text analyzing, speech generation, and the like.

For example, the ML may be involved. The ML is a multi-field interdiscipline, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving its performance. The ML is a core of the AI, is a basic way to make the computer intelligent, and is applied to various fields of the AI. The ML generally includes technologies such as DL, and the DL includes artificial neural networks such as a convolutional neural network (CNN), a recurrent neural network (RNN), and a deep neural network (DNN).

For example, video processing, video semantic understanding (VSU), face recognition, and the like in the computer vision may be involved. The VSU includes target recognition, target detection/localization, and the like. The face recognition includes face 3D reconstruction, face detection, face tracking, and the like.

The AI-based animation character drive method provided in the embodiments of this application is applicable to an audio and video processing device with a capability for driving an animation character. The audio and video processing device may be a terminal device, or may be a server.

The audio and video processing device may have a capability for implementing the speech technology. To make the audio and video processing device capable of listening, seeing, and feeling is the future development direction of human-computer interaction, and the speech has become one of the most promising human-computer interaction methods in the future.

In the embodiments of this application, the audio and video processing device may determine a first expression base of a first animation character corresponding to a speaker in media data by implementing the foregoing computer vision technology, may determine, through the speech technology and the ML according to target text information and the media data, an acoustic feature and a target expression parameter corresponding to the target text information, and further drive a second animation character having a second expression base according to the acoustic feature and the target expression parameter.

If the audio and video processing device is a terminal device, the terminal device may be a smart terminal, a computer, a personal digital assistant (PDA), a tablet computer, or the like.

If the audio and video processing device is a server, the server may be an independent server, or may be a cluster server. When the server implements the method, the terminal device may upload media data including a facial expression and a corresponding speech of the speaker to the server, the server determines an acoustic feature and a target expression parameter, and drives a second animation character on the terminal device according to the acoustic feature and the target expression parameter.

It may be understood that the AI-based animation character drive method provided in the embodiments of this application is applicable to various application scenarios suitable for animation characters, such as a news broadcast, a weather forecast, a game commentary, and a game scene in which a game character having the same face shape as the user is allowed to be constructed, and is also applicable to scenarios in which animation characters are used for undertaking personal services, for example, a one-to-one service directed to individuals such as a psychologist or a virtual assistant. In these scenarios, the animation character may be driven by using the method provided in the embodiments of this application.

For ease of understanding of the technical solutions of this application, the AI-based animation character drive method provided in the embodiments of this application is described below with reference to an actual application scenario.

FIG. 1 is a schematic diagram of an application scenario of an AI-based animation character drive method according to an embodiment of this application. Description is made by using an application scenario in which an audio and video processing device is a terminal device as an example. The application scenario includes a terminal device 101. The terminal device 101 may obtain media data including a facial expression and a corresponding speech of a speaker. There may be one or more pieces of media data. The media data may be a video, or may be a video and audio. A language corresponding to a character included in the speech in the media data may be Chinese, English, Korean, or another language.

The facial expression may be an action made by a face when a speaker says a speech, for example, may be an action made by a mouth, an eye, or an eyebrow, and a video viewer may feel through the facial expression of the speaker that the speech in the media data is said by the speaker.

The terminal device 101 may determine a first expression base of a first animation character corresponding to the speaker according to the facial expression, the first expression base being used for identifying different expressions of the first animation character.

After determining target text information used for driving a second animation character, the terminal device 101 may determine an acoustic feature and a target expression parameter corresponding to the target text information according to the target text information, the foregoing acquired media data, and the first expression base. A representation form of the expression parameter and a face-to-parameter translation parameter that may be involved subsequently may be a coefficient, for example, may be a vector having a specific dimension.

Because the speech and the facial expression in the media data are synchronized, and both the acoustic feature and the target expression parameter are obtained based on the media data and correspond to the same time axis, a sound identified by the acoustic feature and an expression identified by the target expression parameter change synchronously on the same time axis. The generated acoustic feature is a sequence related to a time axis, the target expression parameter is a sequence related to the same time axis, and both may be adjusted accordingly as the text information changes. However, regardless of adjustment, the acoustic feature is used for identifying a sound, in the foregoing media data, that is simulated when the speaker says the target text information, and the target expression parameter is used for identifying a change degree of a facial expression, in the foregoing media data, that is simulated when the speaker says the target text information relative to the first expression base.

Then, the terminal device 101 may drive a second animation character having a second expression base according to the acoustic feature and the target expression parameter, so that the second animation character may simulate, according to the acoustic feature, the sound produced when the speaker says the target text information, and make a facial expression that conforms to an expression of the speaker during sound production. The second animation character may be an animation character the same as the first animation character, or may be an animation character different from the first animation character, which is not limited in this embodiment of this application.

Figure 2:
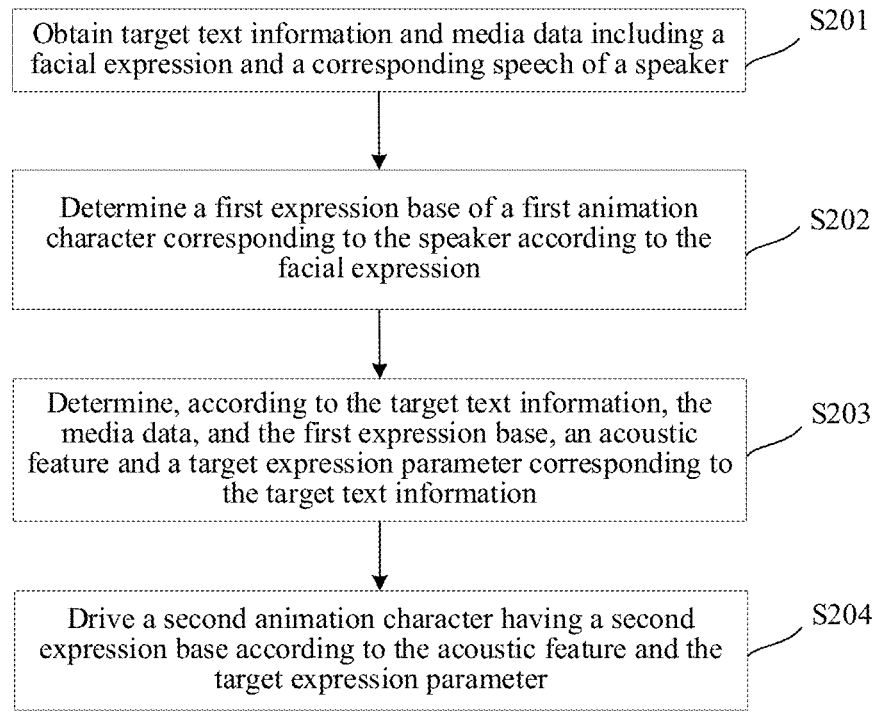
FIG. 2 is a flowchart of an AI-based animation character drive method according to an embodiment of this application.

Next, the AI-based animation character drive method provided in the embodiments of this application is described in detail with reference to the accompanying drawings. Referring to FIG. 2, the method includes the following steps:

S201. Obtain target text information and media data including a facial expression and a corresponding speech of a speaker.

The media data including the facial expression and the corresponding speech may be obtained by recording, in a recording environment with a camera, the speech said by the speaker, and the facial expression corresponding to the speaker by using the camera.

If a video acquired by using the camera includes both the facial expression and the corresponding speech of the speaker, the media data is the video; if a video acquired by using the camera includes the facial expression of the speaker and the speech is acquired by using another device, for example, a speech recording device, the media data includes the video and audio. In this case, the video and the audio are acquired synchronously, the video includes the facial expression of the speaker, and the audio includes the speech of the speaker.

Figure 3:
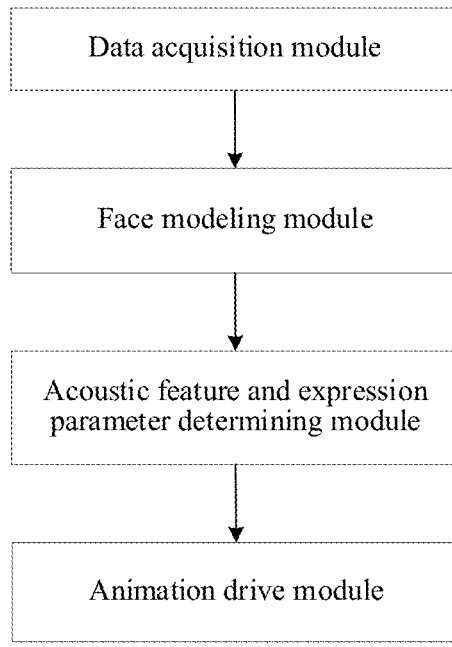
FIG. 3 is a structural flowchart of an animation character drive system according to an embodiment of this application.

The method provided in the embodiments of this application may be implemented by using an animation character drive system. Referring to FIG. 3, the system mainly includes four parts: a data acquisition module, a face modeling module, an acoustic feature and expression parameter determining module, and an animation drive module. The data acquisition module is configured to perform S201, the face modeling module is configured to perform S202, the acoustic feature and expression parameter determining module is configured to perform S203, and the animation drive module is configured to perform S204.

The media data including the facial expression and the corresponding speech of the speaker may be obtained by using the data acquisition module. There may be many choices for the data acquisition module. The data acquisition module may acquire, by using a specialized device, the media data including the speech and the facial expression of the speaker, for example, captures the facial expression of the speaker by using a specialized device such as an action capturing system or a facial expression capturing system. The facial expression may be, for example, a facial action, an expression, or a mouth shape. The speech of the speaker is recorded by using a specialized speech recording device, and data synchronization of the speech and the facial expression is implemented between different devices by triggering a synchronization signal.

Certainly, the specialized device is not limited to an expensive capturing system used, or may be a multi-view ultra-high-definition device. A video including the speech and the facial expression of the speaker is acquired by using the multi-view ultra-high-definition device.

Figure 4:
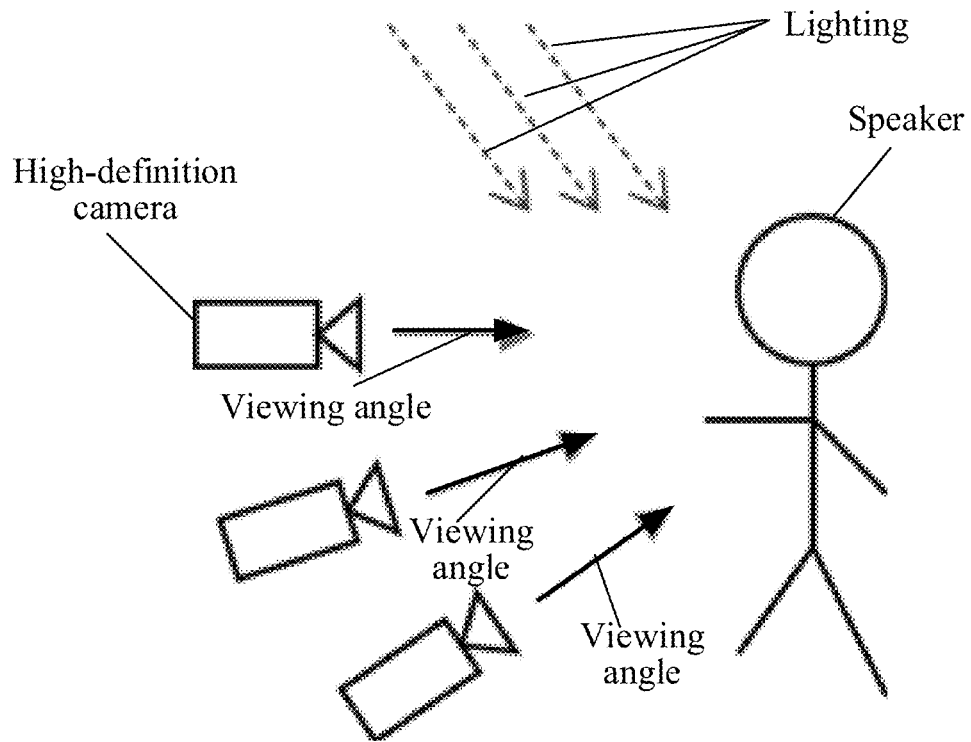
FIG. 4 is an exemplary diagram of a scenario of acquiring media data according to an embodiment of this application.

The data acquisition module may further acquire, by surrounding a plurality of cameras, the media data including the speech and the facial expression of the speaker. In one implementation, 3, 5, or even more ultra-high-definition cameras may be selected for photographing by surrounding the speaker in front. An acquisition environment needs to have stable ambient lighting, and there is no need for the speaker to wear specific clothes. Referring to FIG. 4, three ultra-high-definition cameras are used as an example. Upper dashed arrows represent stable lighting, and three arrows on the left represent relationships between viewing angles of the ultra-high-definition cameras and a speaker, so as to acquire media data including a speech and a facial expression of the speaker. In this case, a video acquired by using the ultra-high-definition camera may include both the speech and the facial expression. That is, the media data is the video.

When the media data is acquired, representation forms of the acquired media data may be different according to different sensors used for acquiring the facial expression. In some cases, the speaker may be photographed by using a red-green-blue deep (RGBD) sensor to establish a face model. Because the RGBD sensor may acquire depth information, and obtains a three-dimensional (3D) reconstruction result of the speaker, the media data includes static modeling of a face corresponding to the speaker, that is, 3D data. In some other cases, there may be no RGBD sensor and the speaker is photographed by using a two-dimensional (2D) sensor instead. In this case, there is no 3D reconstruction result of the speaker. The media data includes video frames corresponding to the speaker, that is, 2D data.

S202. Determine a first expression base of a first animation character corresponding to the speaker according to the facial expression.

After the foregoing media data is obtained, face modeling may be performed on the speaker by using the face modeling module in FIG. 3, to obtain the first expression base of the first animation character corresponding to the speaker. The first expression base is used for identifying expressions of the first animation character.

An objective of the face modeling is to enable that an acquired object such as the speaker mentioned above may be understood and stored by a computer, and includes a shape and a texture of the acquired object. The face modeling may be performed in a plurality of manners, and is mainly implemented from the three perspectives of hardware, labor, and software. The implementation from the hardware perspective may be performing high-precision scanning on a speaker by using a specialized device, for example, a 3D scanning instrument, and manual/automatic cleaning data may be selected for an obtained face model; the implementation from the labor perspective may be manually designing data, cleaning data, or adjusting data by an art designer; the implementation from the software perspective may be automatically generating a face model of a speaker by using a parametrized face-to-parameter translation algorithm.

During expression parametrization, the facial expression modeling may also be implemented from the three perspectives of hardware, labor, and software. For example, after a speaker with an expression may be scanned by using a specialized face scanning device, a parametrized description of the current expression is automatically given. Such a description is related to a customized expression description in the scanning device. However, for an expression parameter manually adjusted by an art designer, an expression type and corresponding face parametrization such as a degree of mouth opening and closing or a motion amplitude of a facial muscle generally need to be predefined. However, for expression parametrization implemented through software, mathematical descriptions of a face in different expressions generally need to defined. For example, after a large amount of real face data is decomposed by using a principal component analysis (PCA) method, a numerical description that best reflects a degree of change of each expression relative to an average face is obtained.

In this embodiment, the face modeling and the expression parametrization based on the software are mainly described. In this case, the mathematical descriptions of the face in different expressions may be defined by using a model library. The animation character (for example, the first animation character and the subsequent second animation character) in this embodiment of this application may be a model in the model library, or may be obtained through a linear combination of models in the model library. The model library may be a face 3D morphable model (3DMM) library, or another model library, which is not limited in this embodiment. The animation character may be a 3D grid.

The 3DMM library is used as an example. The 3DMM library is obtained based on a large amount of high-precision face data by using the PCA method, describes a main change of a high-dimensional face shape and an expression that are relative to the average face, or may describe texture information.

Generally, when the 3DMM library describes an expressionless face shape, the 3DMM library may be obtained through mu+Σ(Pface$_i$–mu)*α$_i$. mu is an average face with a natural expression, Pface$_i$ is an i$^{th}$ face shape principal component, and α$_i$ is a weight of each face shape principal component, that is, a face-to-parameter translation parameter.

Figure 5:
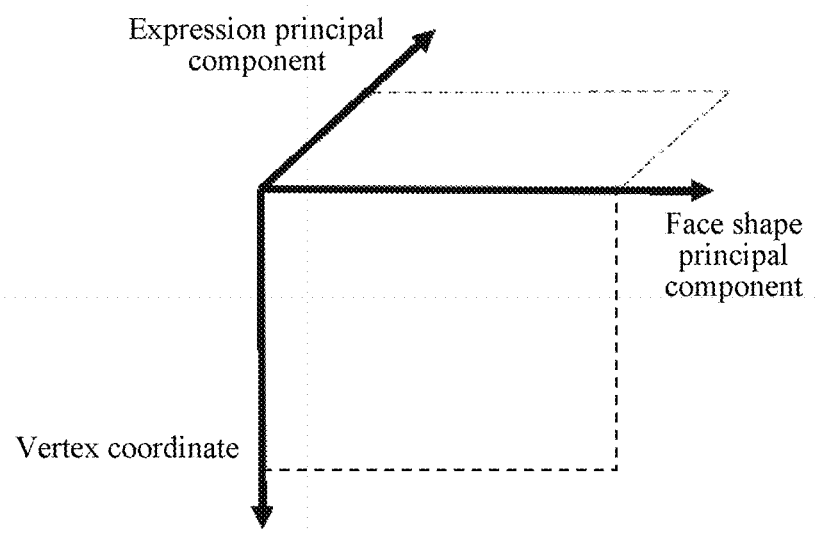
FIG. 5 is an exemplary diagram of distribution and meaning of each dimension of M in a 3DMM library according to an embodiment of this application.

Assuming that a grid corresponding to an animation character in the 3DMM library may be represented by M, that is, a relationship between the face shape, the expression, and a vertex in the 3DMM library is represented by M, and M is a [m×n×d] 3D matrix, where the dimensions are each a vertex coordinate (m), a face shape principal component (n), and an expression principal component (d) of a grid. The distribution and meaning of each dimension of M in the 3DMM library are shown in FIG. 5, and the coordinate axes each represent a vertex coordinate (m), a face shape principal component (n), and an expression principal component (d). Because m represents values of three coordinates of xyz, a quantity of vertices of the grid is m/3, which is denoted by v. If a face shape or an expression of an animation character is determined, M may be a 2D matrix.

In this embodiment of this application, regardless of a texture dimension in the 3DMM library, assuming that driving of the animation character is F, $$F = M \times \alpha \times \beta = \Sigma_{i=1}^{d}(\Sigma_{j=1}^{n} M_{k,j,i} * \alpha_j) * \beta_i \quad (1),$$

where M is a grid of the animation character, α is a face-to-parameter translation parameter, and β is an expression parameter; and n is a quantity of face-to-parameter translation grids in a face-to-parameter translation base, d is a quantity of expression grids in an expression base, $M_{k,j,i}$ is a k$^{th}$ grid including an i$^{th}$ expression grid and a j$^{th}$ face-to-parameter translation grid, α$_j$ is a weight representing a j$^{th}$ face shape principal component in a j$^{th}$ dimension in a set of face-to-parameter translation parameters, and β$_i$ is a weight representing an i$^{th}$ expression principal component in an i$^{th}$ dimension in a set of expression parameters.

A process of determining the face-to-parameter translation parameter is a face-to-parameter translation algorithm, and a process of determining the expression parameter is an expression-to-parameter translation algorithm. The face-to-parameter translation parameter is used for linearly combining with the face-to-parameter translation base to obtain a corresponding face shape. For example, there is a face-to-parameter translation base including 50 face-to-parameter translation grids (pertaining to deformable grids, for example, blendshapes), a face-to-parameter translation parameter corresponding to the face-to-parameter translation base is a vector having 50 dimensions, and each dimension may identify a degree of correlation between a face shape corresponding to the face-to-parameter translation parameter and one face-to-parameter translation grid. The face-to-parameter translation grids included in the face-to-parameter translation base each represent a different face shape, each face-to-parameter translation grid is a facial appearance that changes greatly relative to the average face, and is a face shape principal component in different dimensions obtained by PCA decomposing a large quantity of faces, and vertex sequence numbers corresponding to different face-to-parameter translation grids in the same face-to-parameter translation base are consistent.

The expression parameter is used for linearly combining with the expression base to obtain a corresponding expression. For example, there is an expression base including 50 (equivalent to a quantity of dimensions of 50) expression grids (pertaining to deformable grids, for example, blendshapes), an expression parameter corresponding to the expression base is a vector having 50 dimensions, and each dimension may identify a degree of correlation between an expression corresponding to the expression parameter and one expression grid. The expression grids included in the expression base each represent a different expression, each expression grid is formed by changing the same 3D model under different expressions, and vertex sequence numbers corresponding to different expression grids in the same expression base are consistent.

For the foregoing deformable grids, a single grid may be deformed according to a predefined shape, to obtain any quantity of grids.

The first expression base of the first animation character corresponding to the speaker may be obtained in combination with the foregoing formula (1), so as to subsequently drive the second animation character.

S203. Determine, according to target text information, the media data, and the first expression base, an acoustic feature and a target expression parameter corresponding to the target text information.

The acoustic feature and the target expression parameter corresponding to the target text information may be determined by using the acoustic feature and expression parameter determining module in FIG. 3. The acoustic feature is used for identifying a sound that is simulated when the speaker says the target text information, and the target expression parameter is used for identifying a change degree of a facial expression that is simulated when the speaker says the target text information relative to the first expression base.

It may be understood that there may be a plurality of manners of obtaining the target text information. For example, the target text information may be inputted by a user through a terminal device, or may be obtained through conversion according to a speech inputted to a terminal device.

S204. Drive a second animation character having a second expression base according to the acoustic feature and the target expression parameter.

By using the animation drive module in FIG. 3, an expression identified by the target expression parameter in combination with a speech identified by the acoustic feature are presented by using a plurality of senses in a manner that a human can intuitively understand. A feasible manner is that assuming that the target expression parameter represents weights of expression grids in a second expression base, a corresponding expression may be obtained through a linear combination of weights of the second expression base. During speech production, a second animation character that makes an expression corresponding to the speech is rendered by using a rendering method, so as to drive the second animation character.

It can be learned from the foregoing technical solutions that, a first expression base of a first animation character corresponding to a speaker may be determined by acquiring a video including a facial expression change when the speaker says a speech, and the first expression base may reflect different expressions of the first animation character. After target text information used for driving a second animation character is determined, an acoustic feature and a target expression parameter corresponding to the target text information may be determined according to the target text information, the foregoing media data, and the first expression base. The acoustic feature may be used for identifying a sound that is simulated when the speaker says the target text information, and the target expression parameter may be used for identifying a change degree of a facial expression that is simulated when the speaker says the target text information relative to the first expression base. A second animation character having a second expression base may be driven according to the acoustic feature and the target expression parameter, so that the second animation character may simulate, according to the acoustic feature, the sound produced when the speaker says the target text information, and make a facial expression that conforms to an expression of the speaker during sound production, to bring a realistic sense of presence and immersion to a user, thereby improving experience of interaction between the user and the animation character.

There may be a plurality of implementations of S203. One implementation is described in detail in this embodiment of this application.

In one implementation, the implementation of S203 may include determining an acoustic feature and an expression feature corresponding to the target text information according to the target text information and the media data. The acoustic feature is used for identifying a sound that is simulated when the speaker says the target text information, and the expression feature is used for identifying a facial expression that is simulated when the speaker says the target text information. Then, a target expression parameter is determined according to the first expression base and the expression feature.

The facial expression and the speech of the speaker have been recorded synchronously in the media data. That is, the facial expression and the speech of the speaker in the media data correspond to the same time axis. Therefore, a large amount of media data may be pre-acquired offline as training data. A text feature, an acoustic feature, and an expression feature are extracted from the media data, and a duration model, an acoustic model, and an expression model are obtained by training the features. When media data including a facial expression and a corresponding speech of a speaker is obtained online, a duration corresponding to target text information may be determined by using the duration model, and a corresponding acoustic feature and expression feature are then determined by respectively using the acoustic model and the expression model by combining the duration with a text feature corresponding to the target text information. Because both the acoustic feature and the expression feature correspond to a duration obtained based on the same duration model, the speech is easily synchronized with the expression, so that the second animation character simulates the speaker to make the corresponding expression when simulating the speaker to say the speech corresponding to the target text information.

The following describes one implementation of S204. In this embodiment, the second animation character may be an animation character the same as the first animation character, or may be an animation character different from the first animation character. In the two cases, the implementations of S204 may be different.

In the first case, the first animation character and the second animation character are the same animation character.

In this case, an animation character that needs to be driven is the first animation character. In this way, to drive the first animation character, a face-to-parameter translation parameter of the first animation character further needs to be determined in addition to determining the first expression base, to obtain a face shape of the first animation character. Therefore, in step S202, the first expression base of the first animation character and a face-to-parameter translation parameter of the first animation character may be determined according to the facial expression, the face-to-parameter translation parameter being used for identifying a change degree of a face shape of the first animation character relative to a face-to-parameter translation base corresponding to the first animation character.

There are a plurality of manners of determining the first expression base of the first animation character and a face-to-parameter translation parameter of the first animation character. In some cases, when the face-to-parameter translation parameter is determined based on the media data to establish a face model, the acquired media data usually has a low precision and relatively large noise. Therefore, the established face model has poor quality and many uncertainties, and it is difficult to accurately reflect an actual appearance of a to-be-constructed object. For example, the modeling quality is low due to nonstandard acquisition; a reconstruction process is easily affected by ambient lighting, user makeup, and the like; a reestablished face model includes an expression, which is not in a natural state; an established face model cannot adapt to a video from which an expression parameter is to be extracted. To resolve the problem, an embodiment of this application provides a method for determining a face-to-parameter translation parameter, referring to FIG. 6.

Figure 6:
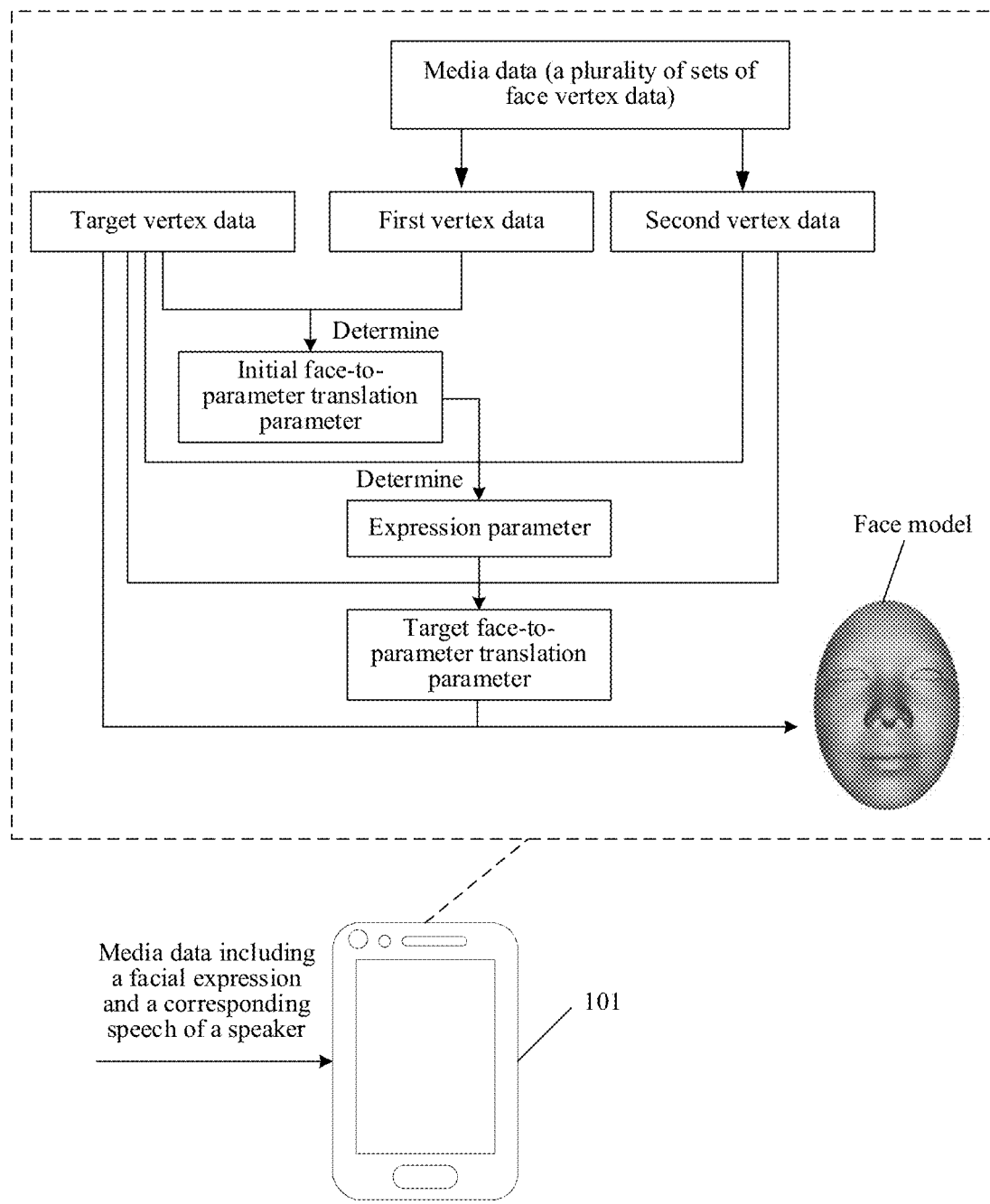
FIG. 6 is a schematic diagram of an application scenario of an animation character drive method based on a determined face-to-parameter translation parameter according to an embodiment of this application.

In FIG. 6, if obtained media data may include a plurality of sets of face vertex data, an initial face-to-parameter translation parameter may be determined based on first vertex data in the plurality of sets of face vertex data and target vertex data in the 3DMM library used for identifying a target face model. On the basis of determining the initial face-to-parameter translation parameter, an expression parameter is determined based on the initial face-to-parameter translation parameter and the target vertex data by obtaining second vertex data in the media data, the expression parameter is then fixed to reversely predict a face-to-parameter translation parameter or reversely predict how to change a face shape to obtain a facial appearance of a speaker under the expression parameter. That is, the initial face-to-parameter translation parameter is corrected in a manner of fixing an expression and reversely predicting the face shape, to obtain a target face-to-parameter translation parameter, so as to use the target face-to-parameter translation parameter as the face-to-parameter translation parameter of the first animation character.

Because the second vertex data and the first vertex data respectively identify different facial appearances of a to-be-constructed object, a probability that the second vertex data and the first vertex data are affected by a completely identical uncertainty is relatively small. On the basis of determining the initial face-to-parameter translation parameter based on the first vertex data, the target face-to-parameter translation parameter corrected based on the second vertex data may offset noise in the first vertex data to some extent, so that the face model corresponding to the speaker determined by using the target face-to-parameter translation parameter has a relatively high accuracy.

Because the first expression base and the second expression base are the same, that is, the quantities of dimensions and semantic information of each dimension of the first expression base and the second expression base are the same and the determined target expression parameter may directly drive the second animation character, the manner of driving the second animation character in S204 may be driving a second animation character having a second expression base according to the acoustic feature, the target expression parameter, and the face-to-parameter translation parameter.

In the second case, the first animation character and the second animation character are different animation characters.

In this case, because the first expression base is different from the second expression base, that is, there are differences in the quantities of dimensions and semantic information of each dimension of the first expression base and the second expression base, it is difficult to drive a second animation character having a second expression base by directly using the target expression parameter. There is a mapping relationship between an expression parameter corresponding to the first animation character and an expression parameter corresponding to the second animation character, and therefore the mapping relationship between the expression parameter corresponding to the first animation character and the expression parameter corresponding to the second animation character may be represented by using a function $f(\ )$. In this way, a formula for calculating the expression parameter corresponding to the second animation character according to the expression parameter corresponding to the first animation character is as follows:

$$\beta^b = f(\beta^a), \quad (2)$$

where $\beta^b$ is the expression parameter corresponding to the second animation character, $\beta^a$ is the expression parameter corresponding to the first animation character, and $f(\ )$ represents the mapping relationship between the expression parameter corresponding to the first animation character and the expression parameter corresponding to the second animation character.

Therefore, if the mapping relationship is determined, the second animation character (for example, an animation character b) may be directly driven by using the expression parameter corresponding to the first animation character (for example, an animation character a). The mapping relationship may be a linear mapping relationship or a non-linear mapping relationship.

To drive the second animation character having the second expression base according to the target expression parameter, the mapping relationship needs to be determined. There may be a plurality of manners of determining the mapping relationship, two determining manners are mainly described in this embodiment.

Figure 7:
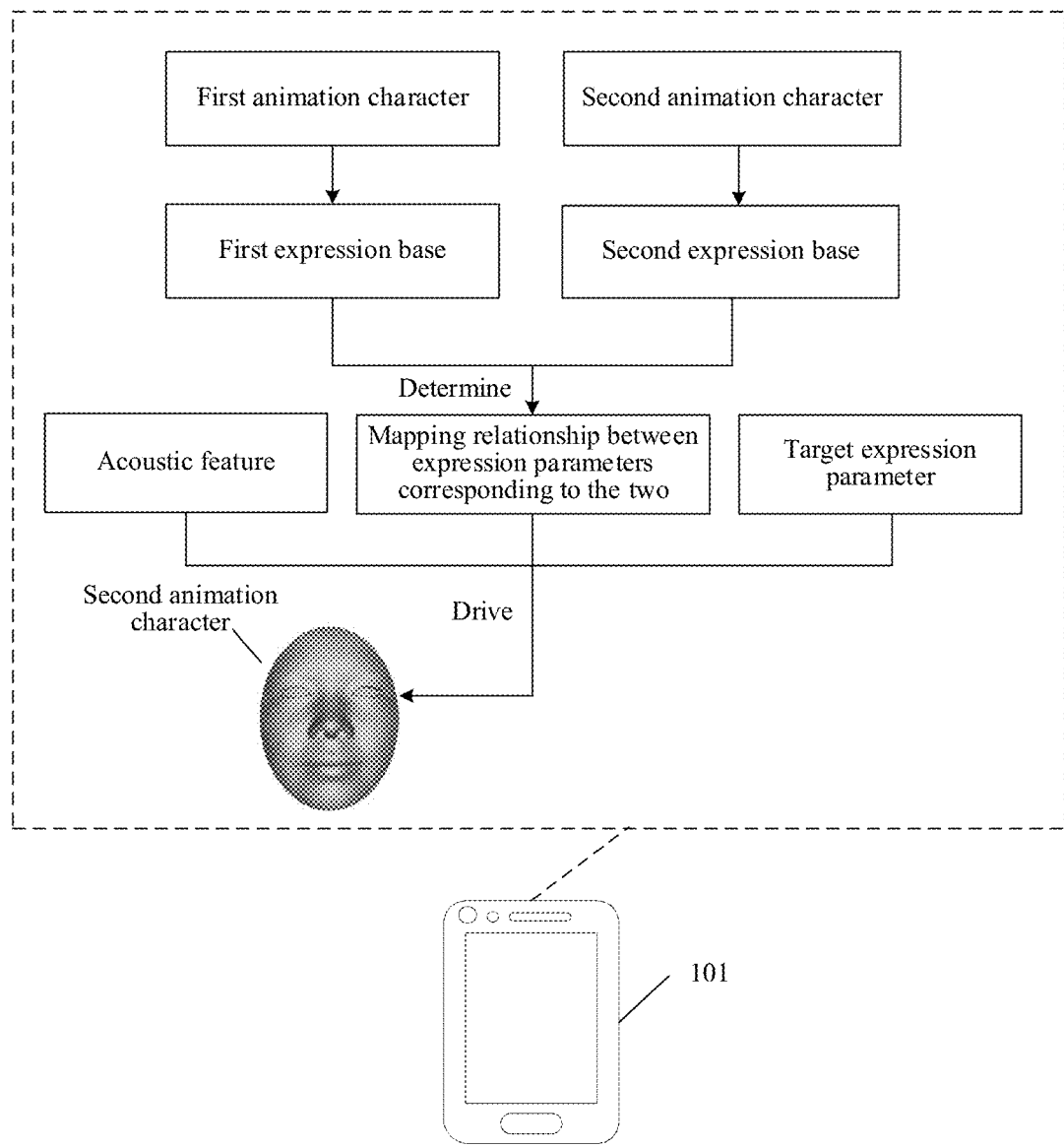
FIG. 7 is a schematic diagram of an application scenario of an animation character drive method based on a determined mapping relationship according to an embodiment of this application.

A first determining manner may include determining a mapping relationship between the expression parameters based on the first expression base corresponding to the first animation character and the second expression base corresponding to the second animation character. Referring to FIG. 7, the first animation character may be driven, according to an actual expression parameter corresponding to the first animation character, to make an actual expression, and the actual expression parameter may reflect a degree of correlation between the actual expression and an expression base under different dimensions, that is, an actual expression parameter corresponding to the second animation character may also reflect a degree of correlation between an actual expression of the second animation character and an expression base under different dimensions. Therefore, the mapping relationship between the expression parameters may be determined based on an association relationship between the foregoing expression parameter and the expression base according to the first expression base corresponding to the first animation character and the second expression base corresponding to the second animation character. Then, the second animation character having the second expression base is driven according to the acoustic feature, the target expression parameter, and the mapping relationship.

A second determining manner may include determining a mapping relationship between the expression parameters based on a preset relationship between a phoneme and the second expression base.

Figures 8, 9:
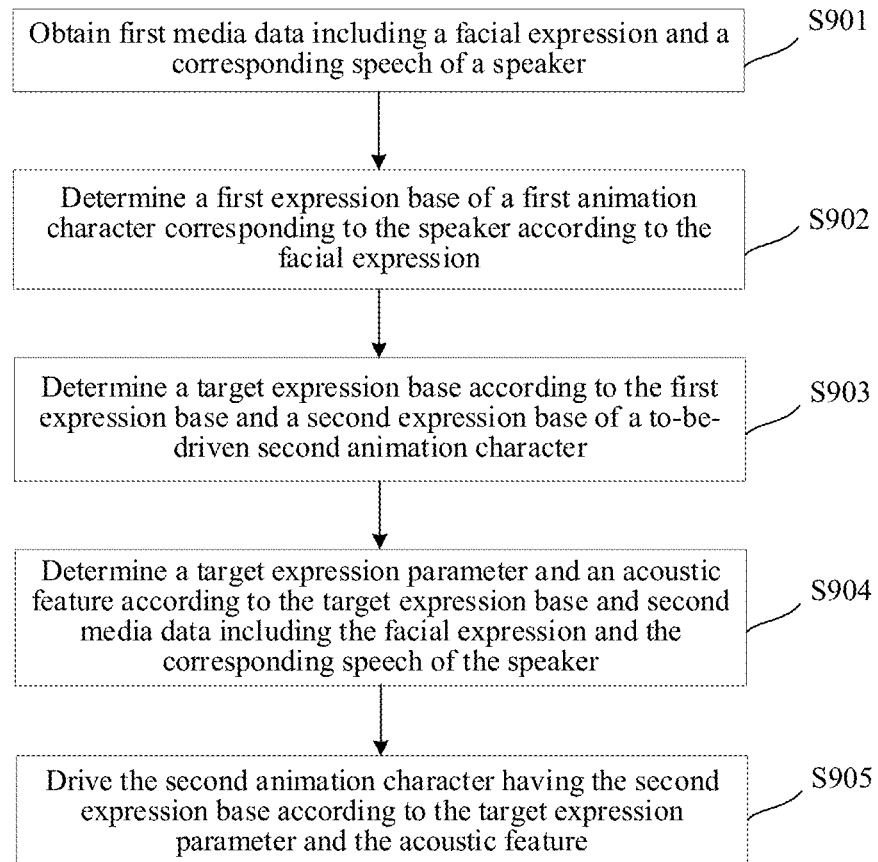
FIG. 8 is an exemplary diagram of a correspondence between a time interval and a phoneme according to an embodiment of this application.
FIG. 9 is a flowchart of an AI-based animation character drive method according to an embodiment of this application.

A phoneme is a minimum phonetic unit obtained through division according to a natural attribute of a speech, analysis is performed according to a pronunciation action in a syllable, and an action (for example, a mouth shape) forms a phoneme. That is, the phoneme is unrelated to the speaker. The corresponding expressions such as mouth shapes have consistency as long as phonemes in a time interval in a speech are the same regardless of who is the speaker, whether a language of the speech is English or Chinese, and whether texts corresponding to produced phonemes are the same. Referring to FIG. 8. FIG. 8 shows a correspondence between a time interval and a phoneme, and describes which time interval corresponds to which phoneme in a speech. For example, "5650000" and "6300000" in a second row represent timestamps, and represent a time interval between 5.65 seconds and 6.3 seconds, and a phoneme produced by a speaker in the time interval is "u". A method for collecting statistics on phonemes is not unique, and 33 Chinese phonemes are used as an example in this embodiment.

A facial expression and a speech in media data are synchronously acquired, and corresponding video frames may be conveniently obtained through division of the speech. That is, a phoneme identified by the speech, a time interval corresponding to the phoneme, and video frames of which the media data is in the time interval are determined according to the media data. Then, a first expression parameter corresponding to the phoneme is determined according to the video frames, the first expression parameter being used for identifying a change degree of a facial expression of the speaker when giving the phoneme relative to a first expression base.

For example, in the second row in FIG. 8, for the phoneme "u", the time interval corresponding to the phoneme is between 5.65 seconds and 6.3 seconds, video frames in the time interval between 5.65 seconds and 6.3 seconds are determined, and a first expression parameter corresponding to the phoneme "u" is extracted according to the video frames. If a first animation character is an animation character a, the first expression parameter may be represented by $\beta^a$. If a quantity of dimensions of the first expression base is $n^a$, the obtained first expression parameter $\beta^a$ is a set of vectors have a length of $n^a$.

A premise of the manner of determining the mapping relationship is that an expression base of another animation character, for example, the second expression base corresponding to the second animation character, is generated according to a preset relationship with the phoneme. The preset relationship represents that one phoneme corresponds to one expression grid. For example, for the second animation character b, the phoneme "u" in the preset relationship corresponds to a first expression grid, a phoneme "i" corresponds to a second expression grid, and so on. If there are $n^b$ phonemes, a second expression base including $n^b$ expression grids may be determined according to a preset relationship. In this case, after the phoneme identified by the speech is determined, a second expression parameter corresponding to the phoneme may be determined according to the preset relationship and the second expression base. Then, a mapping relationship is determined according to the first expression parameter and the second expression parameter.

For example, if the phoneme identified by the speech is "u", and it can be learned according to the second expression base and the preset relationship that the phoneme "u" corresponds to the first expression grid, it can be determined that the second expression parameter is $\beta^b=[1\ 0\ \ldots\ 0]$, $\beta^b$ includes $n^b$ elements, and remaining $(n^b-1)$ elements are all 0 except that a first element is 1.

Therefore, a set of mapping relationships between $\beta^b$ and $\beta^a$ are established. When a large quantity of first expression parameters $\beta^a$ are obtained, a large quantity of corresponding second expression parameters $\beta^b$ may be generated. Assuming that there are L first expression parameters $\beta^a$ and L second expression parameters $\beta^b$, the L first expression parameters $\beta^a$ form a first matrix, and the L second expression parameters $\beta^b$ form a second matrix, which are respectively denoted by $\beta^A$ and $\beta^B$, where $$\beta^A=[L\times n^a],\ \text{and}\ \beta^B=[L\times n^b] \quad (3).$$

If an example in which the relationship between the first expression parameter and the second expression parameter meets a linear mapping relationship is used in this solution, the foregoing formula (2) may be transformed into:

$$\beta^b=f*\beta^a \quad (4).$$

According to the formula (3) and the formula (4), a formula for determining the mapping relationship may be:

$$f=\beta^B*inv(\beta^A) \quad (5),$$

where f is the mapping relationship, $\beta^A$ is the first matrix, $\beta^B$ is the second matrix, and inv is a matrix inversion operation.

After the mapping relationship f is obtained, for any set of first expression parameters $\beta^a$, corresponding $\beta^b=f*\beta^a$ may be obtained, to obtain a second expression parameter according to the first expression parameter, so as to drive the second animation character, for example, the animation character b.

How to drive the animation character based on the text information is mainly described in the foregoing embodiments. In some cases, the animation character may be further directly driven based on the media data. For example, the first animation character corresponding to the speaker in the media data has a first expression base, a quantity of dimensions of the first expression base is a first quantity of dimensions, a vertex topology is a first vertex topology, the first expression base may be represented by Ea, the first quantity of dimensions may be represented by Na, the first vertex topology may be represented by Ta, and a shape of the first expression base Ea is Fa; the to-be-driven second animation character has a second expression base, a quantity of dimensions of the second expression base is a second quantity of dimensions, a vertex topology is a second vertex topology, the second expression base may be represented by Eb, the second quantity of dimensions may be represented by Nb, the second vertex topology may be represented by Tb, and a shape of the second expression base Eb is Fb. It is expected that the second animation character is driven by using the media data including the facial expression and the speech of the speaker.

For this end, an embodiment of this application further provides an AI-based animation character drive method. Referring to FIG. 9, the method includes the following steps:

S901. Obtain first media data including a facial expression and a corresponding speech of a speaker.

S902. Determine a first expression base of a first animation character corresponding to the speaker according to the facial expression.

S903. Determine a target expression base according to the first expression base and a second expression base of a to-be-driven second animation character.

In this embodiment, a quantity of dimensions of the first expression base is different from a quantity of dimensions of the second expression base, and to drive the second animation character according to the facial expression and the speech of the speaker in the media data, a new expression base, for example, a target expression base may be constructed, so that the target expression base has features of both the first expression base and the second expression base.

In an implementation, the implementation of S903 may include: determining, from the first expression base, an expressionless grid corresponding to the first animation character being expressionless, and determining, from the second expression base, an expressionless grid corresponding to the second animation character being expressionless; determining an adjustment grid according to the expressionless grid corresponding to the first character and the expressionless grid corresponding to the second character, the adjustment grid having the second vertex topology used for identifying the first animation character being expressionless; and generating the target expression base according to the adjustment grid and a grid deformation relationship in the second expression base.

Figure 10A:
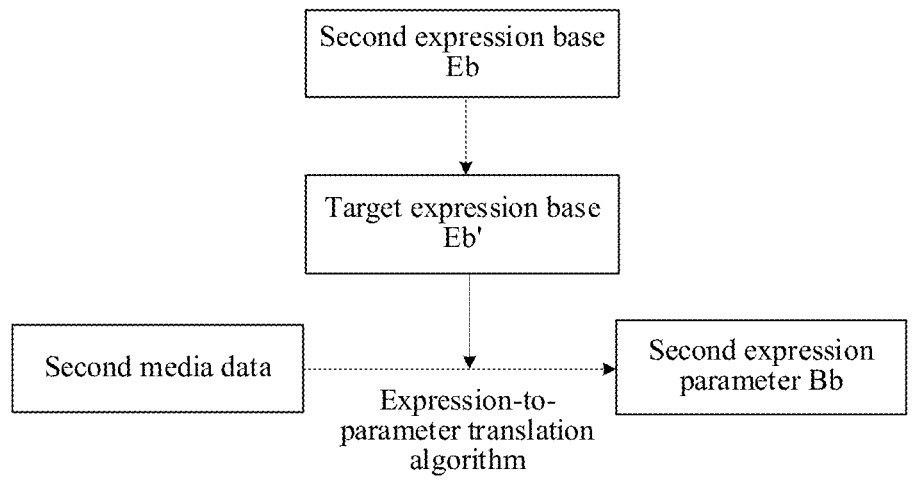
FIG. 10A is a flowchart of an AI-based animation character drive method according to an embodiment of this application.

If the first expression base is Ea, the first quantity of dimensions is Na, the first vertex topology is Ta, the shape of the first expression base Ea is Fa, the second expression base is Eb, the second quantity of dimensions is Nb, the second vertex topology is Tb, and the shape of the second expression base Eb is Fb, a flowchart of the method may be further reference to FIG. 10A. A target expression base Eb' is determined based on the first expression base Ea and the second expression base Eb. The manner of determining the target expression base Eb' may include extracting an expressionless grid of the second expression base Eb and an expressionless grid of the first expression base Ea. The expressionless grid of Eb is attached to the expressionless grid of Ea by using a face-to-parameter translation algorithm, for example, a nricp algorithm, so that the expressionless grid of Eb changes in the shape while maintaining the vertex topology Fb, and the shape is changed to the shape of Ea, to obtain an adjustment grid. The adjustment grid may be represented by Newb. Subsequently, because Newb and a grid deformation relationship between the expression in each dimension in the second expression base Eb relative to the natural expression (no expression) are already known, the target expression base Eb' may be deformed from Newb according to Newb and the grid deformation relationship in the second expression base Eb. A shape of the target expression base Eb' is Fa, a quantity of dimensions is Nb, and a vertex topology is Tb.

S904. Determine a target expression parameter and an acoustic feature according to the target expression base and second media data including the facial expression and the corresponding speech of the speaker.

After the target expression base is obtained, referring to FIG. 10A, the acoustic feature is extracted according to the target expression base Eb' and second media data including the facial expression and the corresponding speech of the speaker, and a target expression parameter Bb is obtained by using an expression-to-parameter translation algorithm. The target expression parameter is used for identifying a change degree of a facial expression when the speaker says the speech relative to the target expression base.

It may be understood that the target expression parameter and the acoustic feature obtained by using the method may be used for retraining the acoustic model and the expression model that are mentioned above.

S905. Drive the second animation character having the second expression base according to the target expression parameter and the acoustic feature.

For specific implementations of S901, S902, and S905, reference may be respectively made to the foregoing implementations of S201, S202, and S204, and details are not described herein again.

Next, the AI-based animation character drive method provided in the embodiments of this application is described with reference to an actual application scenario.

In this application, it is assumed that the first animation character is constructed by imitating a character of the speaker, and the second animation character is a character of a game role that interacts with a user in a game. When the game role communicates with the user according to inputted target text information, and intends to drive, according to the target text information, the game role to simulate the speaker to produce a speech corresponding to the target text information and make a corresponding expression. Therefore, the terminal device may obtain media data including the facial expression and the corresponding speech of the speaker, and determine a first expression base of the first animation character corresponding to the speaker according to the facial expression. Then, the terminal device determines, according to target text information, the media data, and the first expression base, an acoustic feature and a target expression parameter corresponding to the target text information, to drive a second animation character having a second expression base according to the acoustic feature and the target expression parameter, so that the second animation character produces a speech corresponding to the target text information, and makes a corresponding expression. In this way, the user may see that the game role simulates the speaker to produce a speech and makes a corresponding expression, which brings a realistic sense of presence and immersion to the user, thereby improving experience of interaction between the user and the animation character.

Figure 10B:
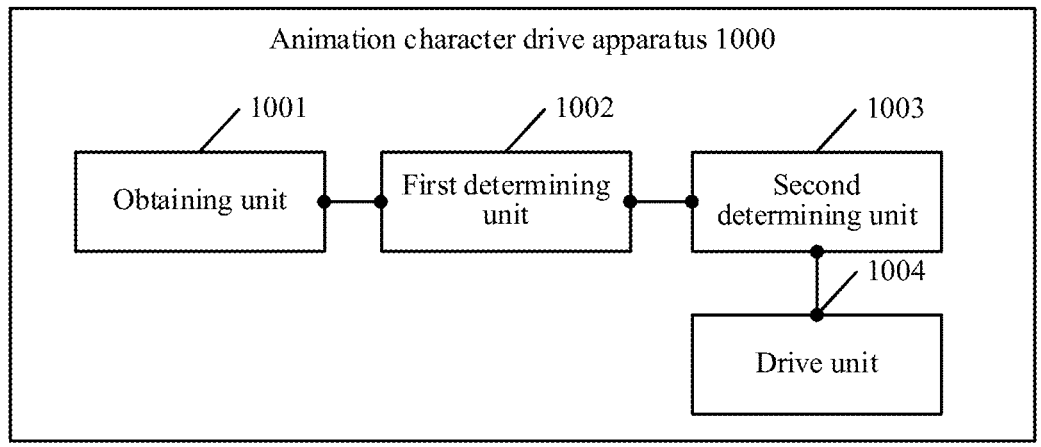
FIG. 10B is a structural diagram of an animation character drive apparatus according to an embodiment of this application.

Based on the method provided in the foregoing embodiments, an embodiment further provides an animation character drive apparatus 1000. The apparatus 1000 is deployed on an audio and video processing device. Referring to FIG. 10B, the apparatus 1000 includes an obtaining unit 1001, a first determining unit 1002, a second determining unit 1003, and a drive unit 1004:

the obtaining unit 1001 being configured to obtain media data including a facial expression and a corresponding speech of a speaker;

the first determining unit 1002 being configured to determine a first expression base of a first animation character corresponding to the speaker according to the facial expression, the first expression base being used for identifying expressions of the first animation character;

the second determining unit 1003 being configured to determine, according to target text information, the media data, and the first expression base, an acoustic feature and a target expression parameter corresponding to the target text information, the acoustic feature being used for identifying a sound that is simulated when the speaker says the target text information, and the target expression parameter being used for identifying a change degree of a facial expression that is simulated when the speaker says the target text information relative to the first expression base; and the drive unit 1004 being configured to drive a second animation character having a second expression base according to the acoustic feature and the target expression parameter.

In one implementation, the first animation character and the second animation character are the same animation character, the first expression base is the same as the second expression base, and the first determining unit 1002 is configured to:

determine the first expression base of the first animation character and a face-to-parameter translation parameter of the first animation character according to the facial expression, the face-to-parameter translation parameter being used for identifying a change degree of a face shape of the first animation character relative to a face-to-parameter translation base corresponding to the first animation character.

The drive unit 1004 is configured to:

drive the second animation character according to the acoustic feature, the target expression parameter, and the face-to-parameter translation parameter.

In one implementation, the first animation character and the second animation character are different animation characters, the first expression base is different from the second expression base, and the drive unit 1004 is configured to:

determine a mapping relationship between an expression parameter corresponding to the first expression base and an expression parameter corresponding to the second expression base; and drive the second animation character according to the acoustic feature, the target expression parameter, and the mapping relationship.

In one implementation, the second expression base is generated according to a preset relationship between the second expression base and a phoneme, and the drive unit 1004 is further configured to:

determine, according to the media data, a phoneme identified by the speech, a time interval corresponding to the phoneme, and video frames in which the media data is in the time interval;

determine a first expression parameter corresponding to the phoneme according to the video frames, the first expression parameter being used for identifying a change degree of a facial expression of the speaker when giving the phoneme relative to the first expression base;

determine a second expression parameter corresponding to the phoneme according to the preset relationship and the second expression base; and determine the mapping relationship according to the first expression parameter and the second expression parameter.

In one implementation, the second determining unit 1003 is configured to:

determine, according to the target text information and the media data, the acoustic feature and an expression feature corresponding to the target text information, the expression feature being used for identifying a facial expression that is simulated when the speaker says the target text information; and determine the target expression parameter according to the first expression base and the expression feature.

Figure 11:
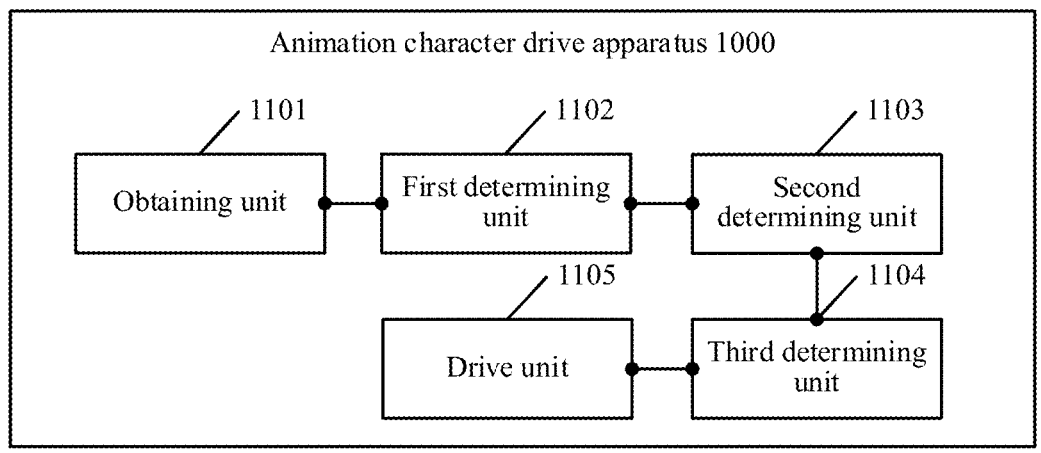
FIG. 11 is a structural diagram of an animation character drive apparatus according to an embodiment of this application.

An embodiment further provides an animation character drive apparatus 1000. The apparatus 1100 is deployed on an audio and video processing device. Referring to FIG. 11, the apparatus 1100 includes an obtaining unit 1101, a first determining unit 1102, a second determining unit 1103, a third determining unit 1104, and a drive unit 1105:

the obtaining unit 1101 being configured to obtain first media data including a facial expression and a corresponding speech of a speaker;

the first determining unit 1102 being configured to determine a first expression base of a first animation character corresponding to the speaker according to the facial expression, the first expression base being used for identifying expressions of the first animation character, a quantity of dimensions of the first expression base being a first quantity of dimensions, a vertex topology being a first vertex topology;

the second determining unit 1103 being configured to determine a target expression base according to the first expression base and a second expression base of a to-be-driven second animation character, a quantity of dimensions of the second expression base being a second quantity of dimensions, a vertex topology being a second vertex topology, the target expression base being an expression base corresponding to a first animation character having the second vertex topology, a quantity of dimensions of the target expression base being the second quantity of dimensions;

the third determining unit 1104 being configured to determine a target expression parameter and an acoustic feature according to the target expression base and second media data including the facial expression and the corresponding speech of the speaker, the target expression parameter being used for identifying a change degree of a facial expression when the speaker says the speech relative to the target expression base; and the drive unit 1105 being configured to drive the second animation character having the second expression base according to the target expression parameter and the acoustic feature.

In one implementation, the second determining unit 1103 is configured to: determine, from the first expression base, an expressionless grid corresponding to the first animation character being expressionless, and determine, from the second expression base, an expressionless grid corresponding to the second animation character being expressionless;

determine an adjustment grid according to the expressionless grid corresponding to the first animation character and the expressionless grid corresponding to the second animation character, the adjustment grid having the second vertex topology used for identifying the first animation character being expressionless; and generate the target expression base according to the adjustment grid and a grid deformation relationship in the second expression base.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 12:
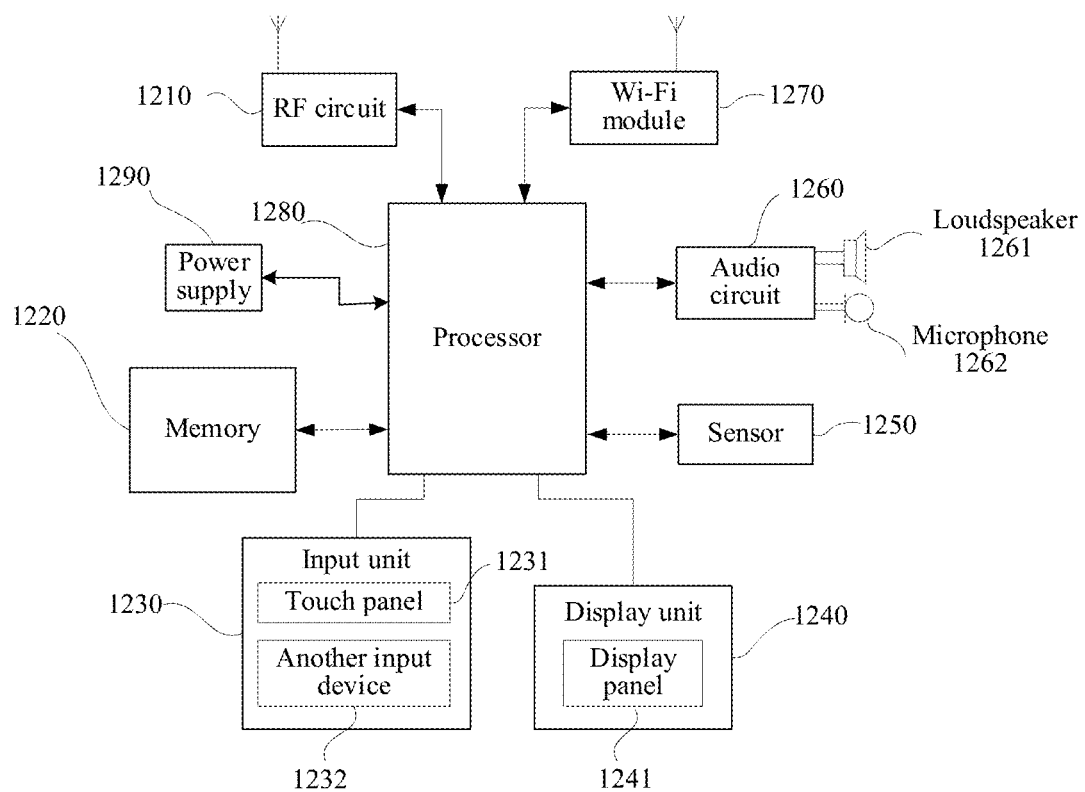
FIG. 12 is a structural diagram of an animation character drive device according to an embodiment of this application.

An embodiment of this application further provides an animation character drive device. The device may drive the animation by using a speech, and the device may be an audio and video processing device. The device is described below with reference to the accompanying drawings. Referring to FIG. 12, an embodiment of this application provides a computing device for driving an animation character, and the computing device may alternatively be a terminal device. The terminal device may be any smart terminal including a mobile phone, a tablet computer, a PDA, a point of sales (POS), or an on-board computer, and the terminal device being a mobile phone is used as an example.

FIG. 12 is a block diagram of a structure of a part of a mobile phone related to a terminal device according to an embodiment of this application. Referring to FIG. 12, the mobile phone includes components such as a radio frequency (RF) circuit 1210, a memory 1220, an input unit 1230, a display unit 1240, a sensor 1250, an audio circuit 1260, a wireless fidelity (Wi-Fi) module 1270, a processor 1280, and a power supply 1290. A person skilled in the art may understand that the structure of the mobile phone shown in FIG. 12 does not constitute a limitation on the mobile phone, and the mobile phone may include more or fewer components than those shown in the figure, or some components may be combined, or a different component deployment may be used.

The following describes the components of the mobile phone with reference to FIG. 12 in detail.

The RF circuit 1210 may be configured to send and receive signals during an information receiving and sending process or a call process. Particularly, the RF circuit receives downlink information from a base station, then delivers the downlink information to the processor 1280 for processing, and sends designed uplink data to the base station. Generally, the RF circuit 1210 includes, but not limited to, an antenna, at least one amplifier, a transceiver, a coupler, a low noise amplifier (LNA), and a duplexer. In addition, the RF circuit 1210 may also communicate with a network and another device by means of wireless communication. The wireless communication may use any communication standard or protocol, including, but not limited to, Global system for mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1220 may be configured to store a software program and a module. The processor 1280 runs the software program and the module that are stored in the memory 1220, to perform various functional applications and data processing of the mobile phone. The memory 1220 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1220 may include a high-speed random access memory, and may also include a nonvolatile memory, for example, at least one magnetic disk storage device, a flash memory, or another volatile solid-state storage device.

The input unit 1230 may be configured to receive input digit or character information, and generate a keyboard signal input related to the user setting and function control of the mobile phone. Specifically, the input unit 1230 may include a touch panel 1231 and another input device 1232. The touch panel 1231, which may also be referred to as a touchscreen, may collect a touch operation of a user on or near the touch panel (such as an operation of a user on or near the touch panel 1231 by using any suitable object or accessory such as a finger or a stylus), and drive a corresponding connection apparatus according to a preset program. Optionally, the touch panel 1231 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 1280. Moreover, the touch controller may receive and execute a command transmitted from the processor 1280. In addition, the touch panel 1231 may be implemented by using various types, such as a resistive type, a capacitive type, an infrared type, and a surface acoustic wave type. In addition to the touch panel 1231, the input unit 1230 may further include the another input device 1232. Specifically, the another input device 1232 may include, but not limited to, one or more of a physical keyboard, a functional key (such as a volume control key or a switch key), a track ball, a mouse, and a joystick.

The display unit 1240 may be configured to display information inputted by the user or information provided for the user, and various menus of the mobile phone. The display unit 1240 may include a display panel 1241. Optionally, the display panel 1241 may be configured in a form of a liquid crystal display (LCD), an organic light-emitting diode (OLED), or the like. Further, the touch panel 1231 may cover the display panel 1241. After detecting a touch operation on or near the touch panel, the touch panel 1231 transfers the touch operation to the processor 1280, to determine a type of a touch event. Then, the processor 1280 provides a corresponding visual output on the display panel 1241 according to the type of the touch event. Although in FIG. 12, the touch panel 1231 and the display panel 1241 are used as two separate parts to implement input and output functions of the mobile phone, in some embodiments, the touch panel 1231 and the display panel 1241 may be integrated to implement the input and output functions of the mobile phone.

The mobile phone may further include at least one sensor 1250 such as an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1260, a loudspeaker 1261, and a microphone 1262 may provide audio interfaces between the user and the mobile phone. The audio circuit 1260 may convert received audio data into an electric signal and transmit the electric signal to the loudspeaker 1261. The loudspeaker 1261 converts the electric signal into a sound signal for output. On the other hand, the microphone 1262 converts a collected sound signal into an electric signal. The audio circuit 1260 receives the electric signal and converts the electric signal into audio data, and outputs the audio data to the processor 1280 for processing. Then, the processor sends the audio data to, for example, another mobile phone by using the RF circuit 1210, or outputs the audio data to the memory 1220 for further processing.

Wi-Fi is a short distance wireless transmission technology. The mobile phone may help, by using the Wi-Fi module 1270, a user receive and transmit an email, browse a web page, access stream media, and the like. This provides wireless broadband Internet access for the user. Although FIG. 12 shows the Wi-Fi module 1270, it may be understood that the Wi-Fi module is not a necessary component of the mobile phone, and the Wi-Fi module may be omitted as required provided that the scope of the essence of the present invention is not changed.

The processor 1280 is the control center of the mobile phone, and is connected to various parts of the mobile phone by using various interfaces and lines. By running or executing the software program and/or module stored in the memory 1220, and invoking data stored in the memory 1220, the processor performs various functions and data processing of the mobile phone, thereby performing overall monitoring on the mobile phone. Optionally, the processor 1280 may include one or more processing units. Preferably, the processor 1280 may integrate an application processor and a modem. The application processor mainly processes an operating system, a user interface, an application program, and the like. The modem mainly processes wireless communication. It may be understood that the modem may either not be integrated into the processor 1280.

The mobile phone further includes the power supply 1290 (such as a battery) for supplying power to the components. Preferably, the power supply may be logically connected to the processor 1280 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment, the processor 1280 included in the terminal device further has the following functions:

obtaining media data including a facial expression and a corresponding speech of a speaker;

determining a first expression base of a first animation character corresponding to the speaker according to the facial expression, the first expression base being used for identifying expressions of the first animation character;

determining, according to target text information, the media data, and the first expression base, an acoustic feature and a target expression parameter corresponding to the target text information, the acoustic feature being used for identifying a sound that is simulated when the speaker says the target text information, and the target expression parameter being used for identifying a change degree of a facial expression that is simulated when the speaker says the target text information relative to the first expression base; and driving a second animation character having a second expression base according to the acoustic feature and the target expression parameter;

or, obtaining first media data including a facial expression and a corresponding speech of a speaker;

determining a first expression base of a first animation character corresponding to the speaker according to the facial expression, the first expression base being used for identifying expressions of the first animation character, a quantity of dimensions of the first expression base being a first quantity of dimensions, a vertex topology being a first vertex topology;

determining a target expression base according to the first expression base and a second expression base of a to-be-driven second animation character, a quantity of dimensions of the second expression base being a second quantity of dimensions, a vertex topology being a second vertex topology, the target expression base being an expression base corresponding to a first animation character having the second vertex topology, a quantity of dimensions of the target expression base being the second quantity of dimensions;

determining a target expression parameter and an acoustic feature according to the target expression base and second media data including the facial expression and the corresponding speech of the speaker, the target expression parameter being used for identifying a change degree of a facial expression when the speaker says the speech relative to the target expression base; and driving the second animation character having the second expression base according to the target expression parameter and the acoustic feature.

Figure 13:
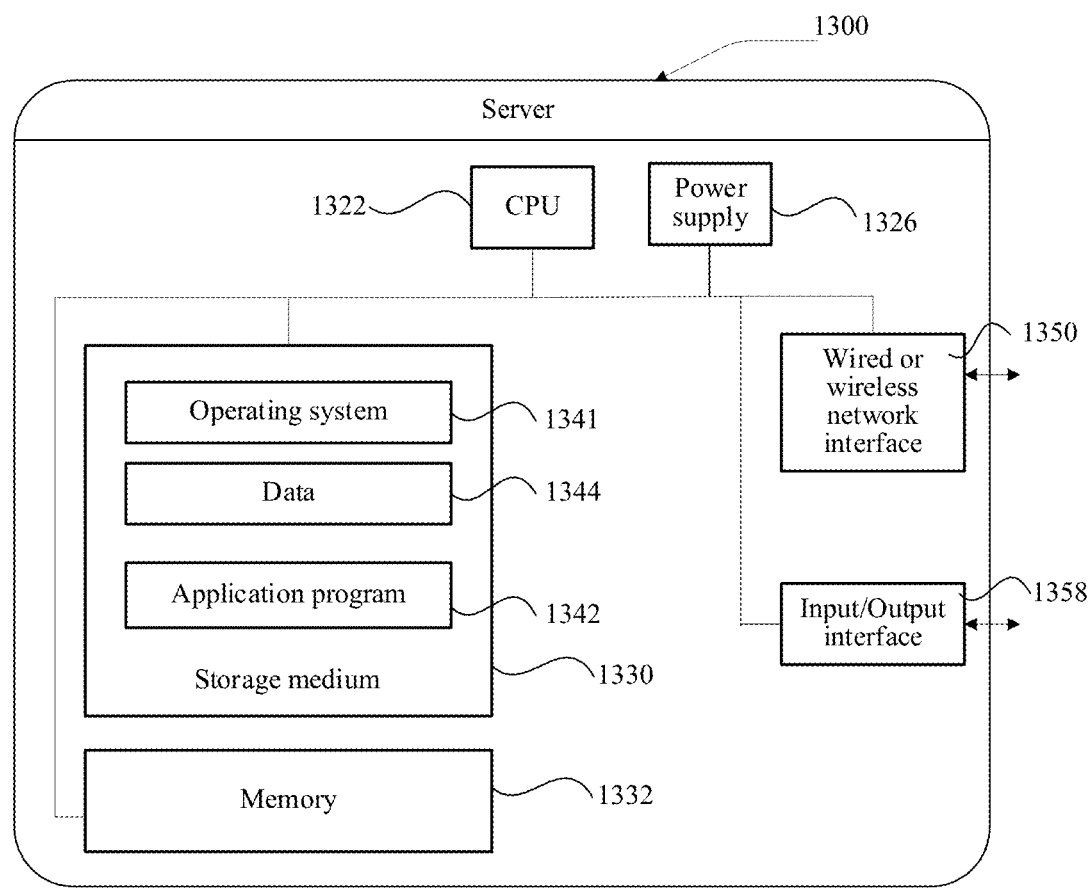
FIG. 13 is a structural diagram of a server according to an embodiment of this application.

An embodiment of this application further provides a server. FIG. 13 is a structural diagram of a server 1300 according to an embodiment of this application. The server 1300 may vary greatly due to different configurations or performance, and may include one or more central processing units (CPUs) 1322 (for example, one or more processors) and a memory 1332, and one or more storage media 1330 (for example, one or more mass storage devices) that store application programs 1342 or data 1344. The memory 1332 and the storage medium 1330 may implement transient storage or permanent storage. A program stored in the storage medium 1330 may include one or more modules (not shown in the figure), and each module may include a series of instruction operations on the server. Furthermore, the CPU 1322 may be configured to communicate with the storage medium 1330, and perform, on the server 1300, the series of instruction operations in the storage medium 1330.

The server 1300 may further include one or more power supplies 1326, one or more wired or wireless network interfaces 1350, one or more input/output interfaces 1358, and/or one or more operating systems 1341 such as Windows Server™, Mac OS X™, Unix™, Linux™, and FreeBSD™.

The steps performed by the server in the foregoing embodiments may be based on the server structure shown in FIG. 13.

An embodiment of this application further provides a computer-readable storage medium, configured to store program code, the program code being used for performing the animation character drive method according to the foregoing embodiments.

An embodiment of this application further provides a computer program product including instructions, the instructions, when being run on a computer, causing the computer to perform the animation character drive method according to the foregoing embodiments.

In the specification and the accompanying drawings of this application, the terms "first", "second", "third", "fourth", and the like (if existing) are intended to distinguish between similar objects rather than describe a specific sequence or a precedence order. Data used in this way may be interchanged in an appropriate case, so that the embodiments of this application described herein can be implemented in a sequence other than the sequence illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In this application, "at least one" refers to one or more, and "a plurality of" refers to two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relationship between the associated objects. "At least one of the following" or a similar expression thereof refers to any combination of these items, including one item or any combination of a plurality of items. For example, at least one of a, b, or c may represent a, b, c, "a and b", "a and c", "b and c", or "a, b, and c", where a, b, and c may be singular or plural.

In the several embodiments provided in this application, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and components displayed as units may or may not be physical units, that is, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store a computer program, such as a USB flash drive, a removable hard disk, a read-only memory (ROM), a random access memory (RAM), a magnetic disk, or an optical disk.

The foregoing embodiments are merely intended for describing the technical solutions of this application, but not for limiting this application. Although this application is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of this application.

What is claimed is:

1. An animation character drive method performed by a computing device, the method comprising:
    obtaining simultaneously captured multi-modal media data including a facial expression and a corresponding speech of a speaker;
    determining a first expression base of a first animation character corresponding to the speaker according to the facial expression;
    determining, according to the media data and the first expression base, an acoustic feature and a target expression parameter of the first animation character speaking target text information, the acoustic feature characterizing a sound of the speaker when speaking the target text information, and the target expression parameter characterizing a facial expression of the speaker when speaking the target text information based on the first expression base;
    determining a mapping relationship between the first expression base of the first animation character and the second expression base of the second animation character, wherein an expression parameter of the first expression base is a function of an expression parameter of the second expression base; and
    driving a second animation character having a second expression base to simulate a sound of the speaker speaking the target text information based on the acoustic feature and a facial expression of the second animation character based on the mapping relationship, the target expression parameter and the second expression base simultaneously.

2. The method according to claim 1, wherein the determining a first expression base of a first animation character corresponding to the speaker according to the facial expression comprises:
    determining the first expression base of the first animation character and a face-to-parameter translation parameter of the first animation character according to the facial expression, the face-to-parameter translation parameter being used for identifying a change degree of a face shape of the first animation character relative to a face-to-parameter translation base corresponding to the first animation character.

3. The method according to claim 1, wherein the second expression base is generated according to a preset relationship between the second expression base and a phoneme, and the determining a mapping relationship between an expression parameter corresponding to the first expression base and an expression parameter corresponding to the second expression base comprises:
    determining, according to the media data, a phoneme identified by the speech, a time interval corresponding to the phoneme, and video frames in which the media data is in the time interval;
    determining a first expression parameter corresponding to the phoneme according to the video frames, the first expression parameter being used for identifying a change degree of a facial expression of the speaker when giving the phoneme relative to the first expression base;
    determining a second expression parameter corresponding to the phoneme according to the preset relationship and the second expression base; and
    determining the mapping relationship in a function form according to the first expression parameter and the second expression parameter.

4. The method according to claim 1, wherein the determining, according to the media data and the first expression base, an acoustic feature and a target expression parameter of the first animation character speaking target text information comprises:
    determining, according to the target text information and the media data, the acoustic feature and an expression feature corresponding to the target text information, the expression feature identifying a facial expression of the speaker when the speaker says the target text information; and
    determining the target expression parameter according to the first expression base and the expression feature.

5. A computing device comprising a processor and a memory coupled to the processor, wherein the memory stores a plurality of computer programs that, when executed by the processor, cause the computing device to perform a plurality of operations including:
    obtaining simultaneously captured multi-modal media data including a facial expression and a corresponding speech of a speaker;
    determining a first expression base of a first animation character corresponding to the speaker according to the facial expression;
    determining, according to the media data and the first expression base, an acoustic feature and a target expression parameter of the first animation character speaking target text information, the acoustic feature characterizing a sound of the speaker when speaking the target text information, and the target expression parameter characterizing a facial expression of the speaker when speaking the target text information based on the first expression base;
    determining a mapping relationship between the first expression base of the first animation character and the second expression base of the second animation character, wherein an expression parameter of the first expression base is a function of an expression parameter of the second expression base; and
    driving a second animation character having a second expression base to simulate a sound of the speaker speaking the target text information based on the acoustic feature and a facial expression of the second animation character based on the mapping relationship, the target expression parameter and the second expression base simultaneously.

6. The computing device according to claim 5, wherein the determining a first expression base of a first animation character corresponding to the speaker according to the facial expression comprises:
    determining the first expression base of the first animation character and a face-to-parameter translation parameter of the first animation character according to the facial expression, the face-to-parameter translation parameter being used for identifying a change degree of a face shape of the first animation character relative to a face-to-parameter translation base corresponding to the first animation character.

7. The computing device according to claim 6, wherein the second expression base is generated according to a preset relationship between the second expression base and a phoneme, and the determining a mapping relationship between an expression parameter corresponding to the first expression base and an expression parameter corresponding to the second expression base comprises:
  determining, according to the media data, a phoneme identified by the speech, a time interval corresponding to the phoneme, and video frames in which the media data is in the time interval;
  determining a first expression parameter corresponding to the phoneme according to the video frames, the first expression parameter being used for identifying a change degree of a facial expression of the speaker when giving the phoneme relative to the first expression base;
  determining a second expression parameter corresponding to the phoneme according to the preset relationship and the second expression base; and
  determining the mapping relationship in a function form according to the first expression parameter and the second expression parameter.

8. The computing device according to claim 5, wherein the determining, according to the media data and the first expression base, an acoustic feature and a target expression parameter of the first animation character speaking target text information comprises:
  determining, according to the target text information and the media data, the acoustic feature and an expression feature corresponding to the target text information, the expression feature identifying a facial expression of the speaker when the speaker says the target text information; and
  determining the target expression parameter according to the first expression base and the expression feature.

9. A non-transitory computer-readable storage medium storing a plurality of computer programs that, when executed by a processor of a computing device, cause the computing device to perform a plurality of operations including:
  obtaining simultaneously captured multi-modal media data including a facial expression and a corresponding speech of a speaker;
  determining a first expression base of a first animation character corresponding to the speaker according to the facial expression;
  determining, according to the media data and the first expression base, an acoustic feature and a target expression parameter of the first animation character speaking target text information, the acoustic feature characterizing a sound of the speaker when speaking the target text information, and the target expression parameter characterizing a facial expression of the speaker when speaking the target text information based on the first expression base;
  determining a mapping relationship between the first expression base of the first animation character and the second expression base of the second animation character, wherein an expression parameter of the first expression base is a function of an expression parameter of the second expression base; and
  driving a second animation character having a second expression base to simulate a sound of the speaker speaking the target text information based on the acoustic feature and a facial expression of the second animation character based on the mapping relationship, the target expression parameter and the second expression base simultaneously.

10. The non-transitory computer-readable storage medium according to claim 9, wherein the determining a first expression base of a first animation character corresponding to the speaker according to the facial expression comprises:
  determining the first expression base of the first animation character and a face-to-parameter translation parameter of the first animation character according to the facial expression, the face-to-parameter translation parameter being used for identifying a change degree of a face shape of the first animation character relative to a face-to-parameter translation base corresponding to the first animation character.

11. The non-transitory computer-readable storage medium according to claim 9, wherein the second expression base is generated according to a preset relationship between the second expression base and a phoneme, and the determining a mapping relationship between an expression parameter corresponding to the first expression base and an expression parameter corresponding to the second expression base comprises:
  determining, according to the media data, a phoneme identified by the speech, a time interval corresponding to the phoneme, and video frames in which the media data is in the time interval;
  determining a first expression parameter corresponding to the phoneme according to the video frames, the first expression parameter being used for identifying a change degree of a facial expression of the speaker when giving the phoneme relative to the first expression base;
  determining a second expression parameter corresponding to the phoneme according to the preset relationship and the second expression base; and
  determining the mapping relationship according to the first expression parameter and the second expression parameter.

12. The non-transitory computer-readable storage medium according to claim 9, wherein the determining, according to target text information, the media data, and the first expression base, an acoustic feature and a target expression parameter corresponding to the target text information comprises:
  determining, according to the target text information and the media data, the acoustic feature and an expression feature corresponding to the target text information, the expression feature being used for identifying a facial expression that is simulated when the speaker says the target text information; and
  determining the target expression parameter according to the first expression base and the expression feature.

* * * * *